United States Patent
Tran

(10) Patent No.: US 7,828,036 B2
(45) Date of Patent: *Nov. 9, 2010

(54) WIND SENSING AWNING CONTROL HAVING ARM-MOUNTED SENSOR

(75) Inventor: Tuong Tran, Lagrange, IN (US)

(73) Assignee: Dometic, LLC, Elkhart, IN (US)

( * ) Notice: Subject to any disclaimer, the term of this patent is extended or adjusted under 35 U.S.C. 154(b) by 491 days.

This patent is subject to a terminal disclaimer.

(21) Appl. No.: 11/289,243

(22) Filed: Nov. 29, 2005

(65) Prior Publication Data

US 2007/0240831 A1    Oct. 18, 2007

Related U.S. Application Data

(60) Provisional application No. 60/631,357, filed on Nov. 29, 2004.

(51) Int. Cl.
    *E05F 15/20* (2006.01)
(52) U.S. Cl. ................... 160/5; 160/66; 160/67
(58) Field of Classification Search ............ 160/1, 160/2, 5, 7, 45, 66, 67; 73/204.22
    See application file for complete search history.

(56) References Cited

U.S. PATENT DOCUMENTS

| | | | |
|---|---|---|---|
| 4,537,068 A * | 8/1985 | Wrobel et al. | 73/861.02 |
| 4,648,270 A * | 3/1987 | Johnson et al. | 73/202.5 |
| 4,860,583 A * | 8/1989 | Olson | 73/204.15 |
| 5,225,748 A * | 7/1993 | Haring | 318/266 |
| 5,307,856 A * | 5/1994 | Murray | 160/70 |
| 6,111,376 A * | 8/2000 | Jean-Marc | 318/432 |
| 6,484,069 B2 | 11/2002 | Osinga | |
| 6,732,018 B2 * | 5/2004 | Osinga | 700/275 |
| 6,798,158 B2 * | 9/2004 | Evans | 318/266 |
| 7,152,652 B2 * | 12/2006 | Heitel | 160/5 |
| 2001/0027846 A1 | 10/2001 | Osinga | |
| 2004/0075411 A1 | 4/2004 | Evans | |

FOREIGN PATENT DOCUMENTS

| | | |
|---|---|---|
| DE | 2931956 A1 | 2/1981 |
| DE | 9312592 U1 | 12/1993 |
| DE | 4407342 A1 | 11/1994 |
| DE | 10033831 A1 | 3/2001 |
| EP | 0073858 A1 | 3/1983 |
| EP | 1069257 A2 | 1/2001 |
| EP | 1077378 A1 | 2/2001 |
| EP | 1413694 A3 | 1/2005 |
| JP | 2091346 A | 3/1990 |
| JP | 2091348 A | 3/1990 |
| JP | 6257262 A | 9/1994 |

* cited by examiner

*Primary Examiner*—Blair M. Johnson
(74) *Attorney, Agent, or Firm*—Pearne & Gordon LLP

(57) ABSTRACT

A powered awning assembly has an awning frame with a first side arm member having a first distal end and a first proximate end for attachment to a wall and a second side arm member having a second distal end and a second proximate end for attachment to a wall. A connecting member has a first end attached to the distal end of the first side arm and a second end attached to the distal end of the second side arm. A roll awning is attached to the awning frame. A wind sensor assembly is attached to one of the first side arm and the second side arm.

3 Claims, 7 Drawing Sheets

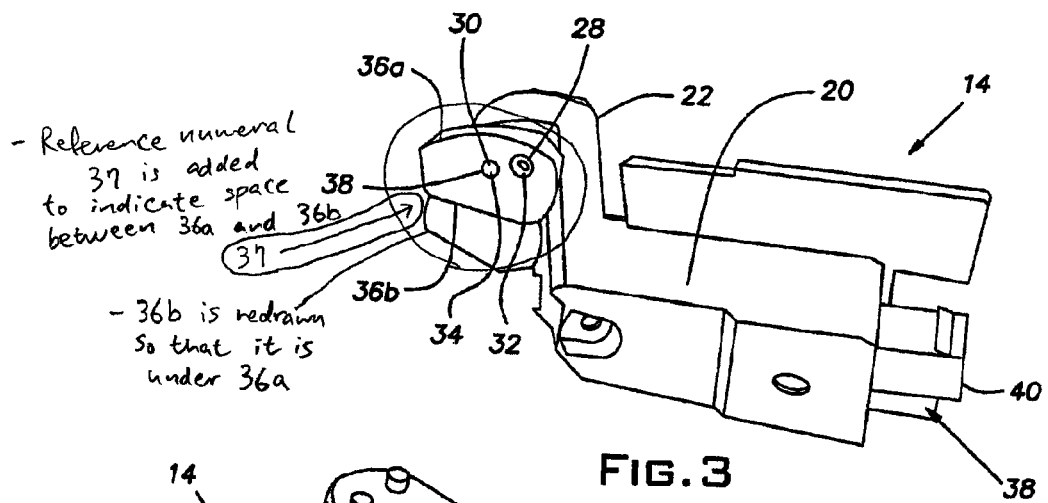
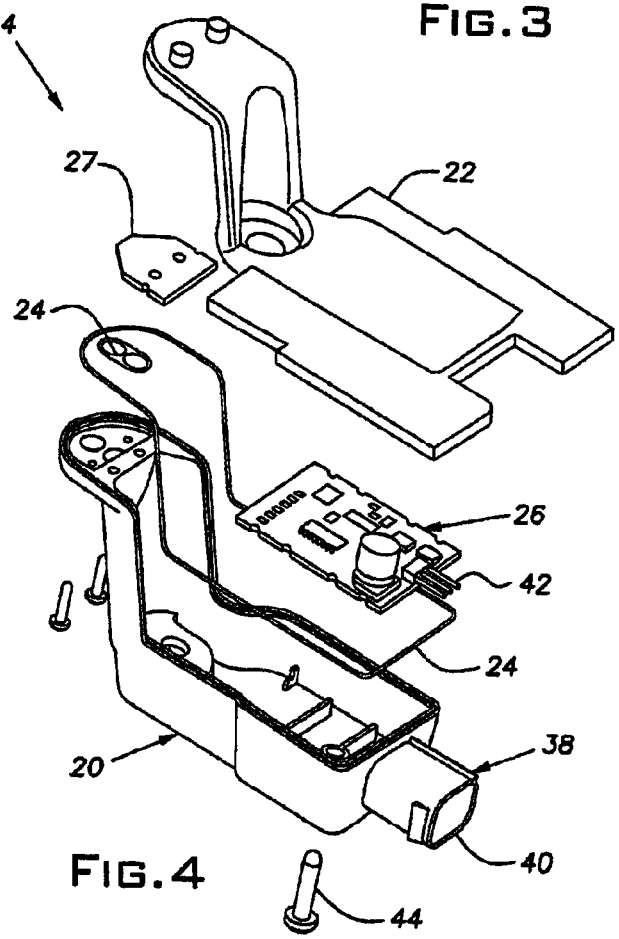

WIND SENSING AWNING CONTROL HAVING ARM-MOUNTED SENSOR

CROSS-REFERENCE TO RELATED APPLICATIONS

This application claims the benefit of U.S. Provisional Patent Application No. 60/631,357 filed on Nov. 29, 2004, the entirety of which is incorporated by reference herein.

BACKGROUND OF THE INVENTION

The present invention relates generally to a motorized roll-type awning, and more particularly to an automatic controller with a solid-state wind velocity sensor mounted on a structural support arm of the awning.

Roll-type sun shades or awnings are often provided on mobile homes and other structures. It is well known to provide electric motors that extend and retract such roll-type awnings. Further, automatic controls may be associated with such sun shades, which, in conjunction with limit switches or sensors, automatically stop the motor when the awning is fully retracted or extended.

It is further known to provide a mechanical wind sensor to further control the operation of the awning motor. Since excessive wind can cause damage to the awning fabric or mechanism, it is desirable for the extension and retraction of the awing to be controlled based upon wind velocity. One type of wind speed based awning control includes an anemometer mounted on the roof of the recreational vehicle to determine wind velocity. However, installation of such a control system adds to the complexity of installing the awning since the anemometer must be separately mounted to the recreation vehicle and connected by wiring to the main control circuit. Furthermore, since the anemometer is located on the roof of the recreational vehicle and the awning is partially shielded from the wind by the body of the recreational vehicle, the anemometer may be exposed to significantly more wind then the awning it is controlling, resulting in unnecessary retraction of the awning.

BRIEF SUMMARY OF THE INVENTION

The present invention provides a powered awning assembly comprising: an awning frame comprising a first side arm member having a first distal end and a first proximate end for attachment to a wall, a second side arm member having a second distal end and a second proximate end for attachment to a wall, and a connecting member having a first end attached to the distal end of the first side arm and a second end attached to the distal end of the second side arm; a roll awning attached to the awning frame; and a wind sensor assembly attached to one of the first side arm and the second side arm.

BRIEF DESCRIPTION OF THE DRAWINGS

FIG. 3 is a bottom perspective view of the wind sensor assembly of FIG. 2;

FIG. 4 is an exploded perspective view of the wind sensor assembly of FIG. 2;

DETAILED DESCRIPTION OF THE PRESENT INVENTION

Figure 1:
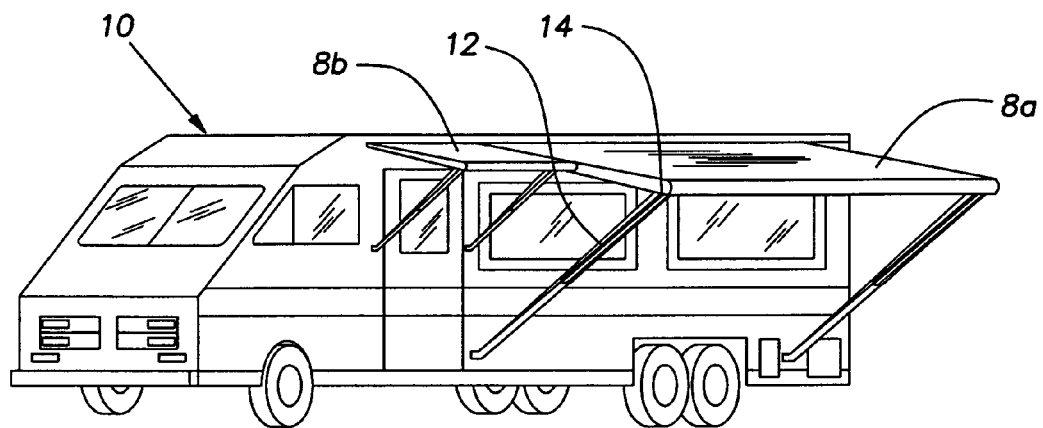
FIG. 1 shows a recreational vehicle having awnings and a wind sensor assembly according a first example embodiment of the present invention.

The present invention relates to an awning control, for controlling one or more awnings 8a, 8b on a recreational vehicle 10 (FIG. 1). Each awning 8a, 8b comprises an awning support frame and an awning roll. The awning support frame of the first awning 8a comprises a plurality of frame members including two side arm members 12, each having a proximate end attached to an outside wall of the recreational vehicle 10. The awning roll acts as a connecting member being attached at each end to a distal end of one of the two side arm members 12.

With reference to FIGS. 1-4 and 5A-5C, a first example embodiment a wind sensing awning control according the present invention is shown and described. The awning control includes a wind speed sensor 14 mounted on one of the two side arm members 12 of the first awning 8a for automatically closing the awnings 8a, 8b in response to high wind levels. A wind speed-sensing control circuit 18 is located within the recreational vehicle 10.

Figure 2:
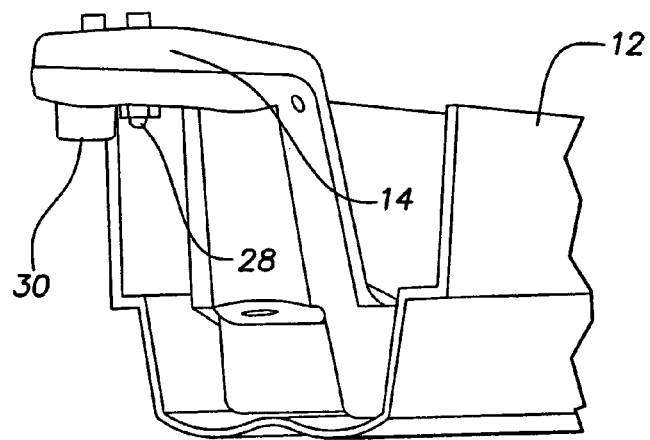
FIG. 2 is a detail of a support arm of the awning of FIG. 1 showing the wind sensor assembly mounted thereon, the wind sensor assembly having a pair of skirts removed for purposes of illustration.

As best show in FIGS. 2-4, according to an example embodiment of the present invention, the wind speed sensor 14 comprises a sensor housing 20 and a housing cover 22. A housing gasket 24 is provided between the sensor housing 20 and the housing cover 22 to provide a watertight seal. A main circuit board 26 is provided within a lower portion of the sensor housing 20. Optionally, portions of the wind speed-sensing control circuit 18 can be provided on the main circuit board 26. A thermistor circuit board 27 is provided within an upper portion of the sensor housing 20 and is connect via wires (not shown) to the main circuit board 26. A first thermistor 28 and a second thermistor 30 are mounted the thermistor circuit board 27 and extend through a first thermistor hole 32, and a second thermistor hole 34 respectively into an upper skirt 36a. A wind speed sensing zone 37 is defined in the space between the upper skirt 36a, a lower skirt 36b, the first thermistor 28, and the second thermistor 30. The first thermistor 28 acts as an ambient temperature sensor to a temperature of wind in the sensing zone 37 for the purpose of temperature compensation. The second thermistor 30 acts as a heated temperature sensor to sense a cooling effect over a period of time caused by wind passing through the sensing zone 37. As explained in detail below, the wind speed is determined based upon the amount of cooling of the second thermistor 30 for a given wind temperature measured by the first thermistor 28.

The main circuit board 26 is connected to a three-pin male connector 38 provided on the bottom of the sensor 14. The three-pin female connector 38 comprises a connector body 40 and three conductive pins 42 extending from the main circuit board 26. The connector 38 attaches to a female connector of a wiring harness (not shown) to connect the first and second thermistors 28,30 to the wind speed-sensing control circuit 18 located within the recreational vehicle 10. The sensor 14 is mounted to the side arm member 12 by a mounting screw 44.

Figure 5A:
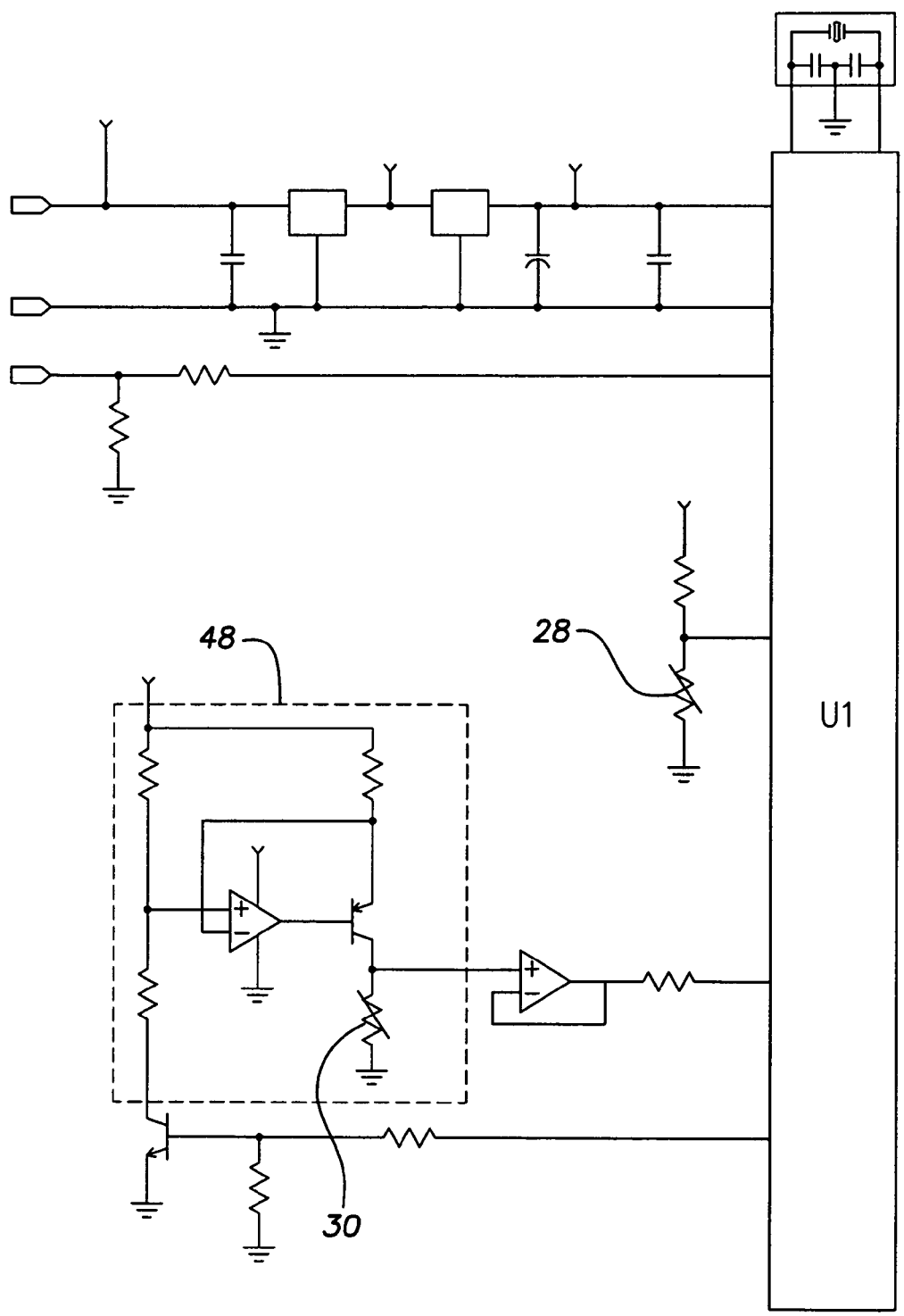
FIGS. 5A, 5B and 5C are a schematic diagram of an awning control according an example embodiment of the present invention.
Figure 5B:
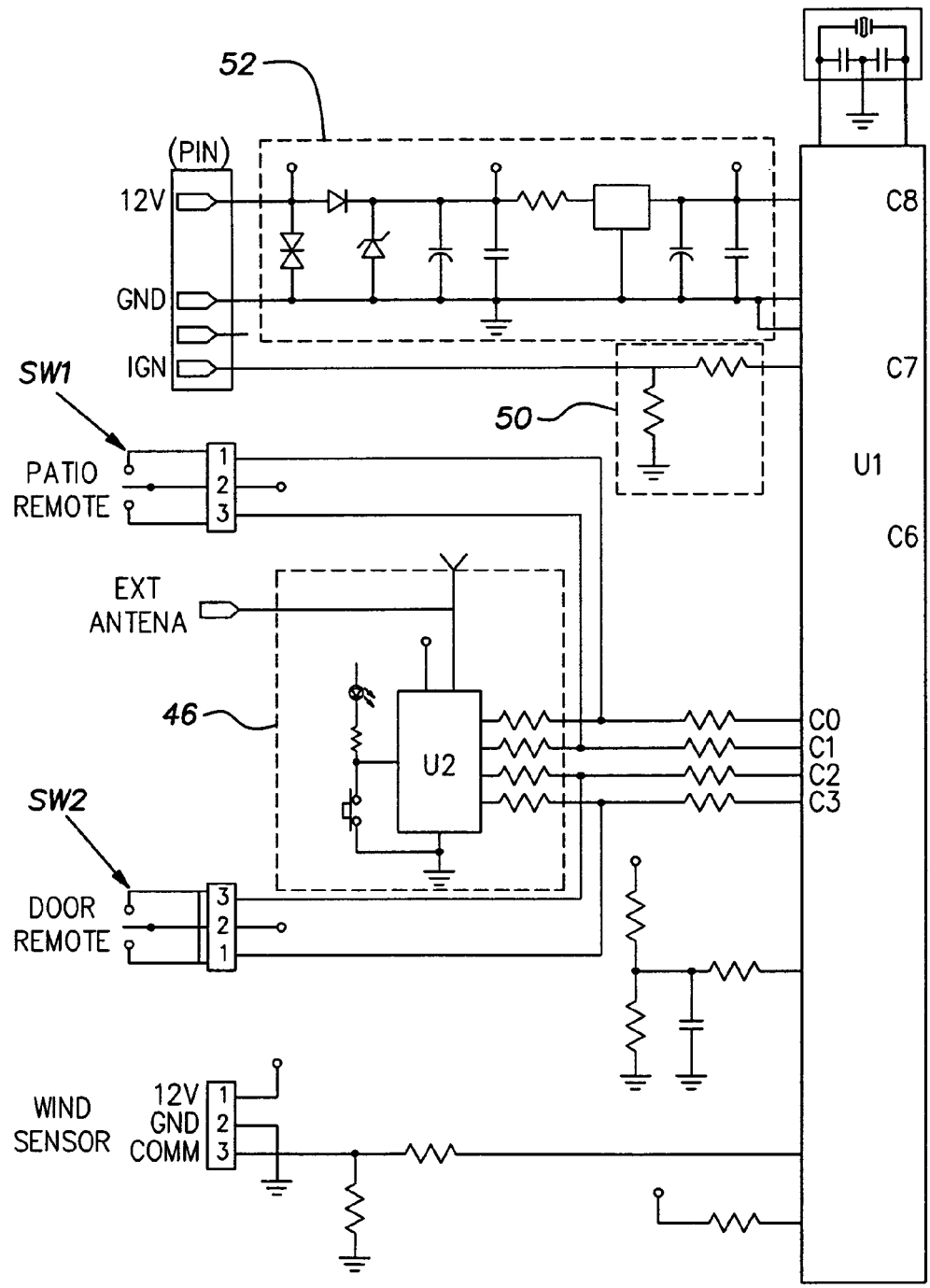
Figure 5C:
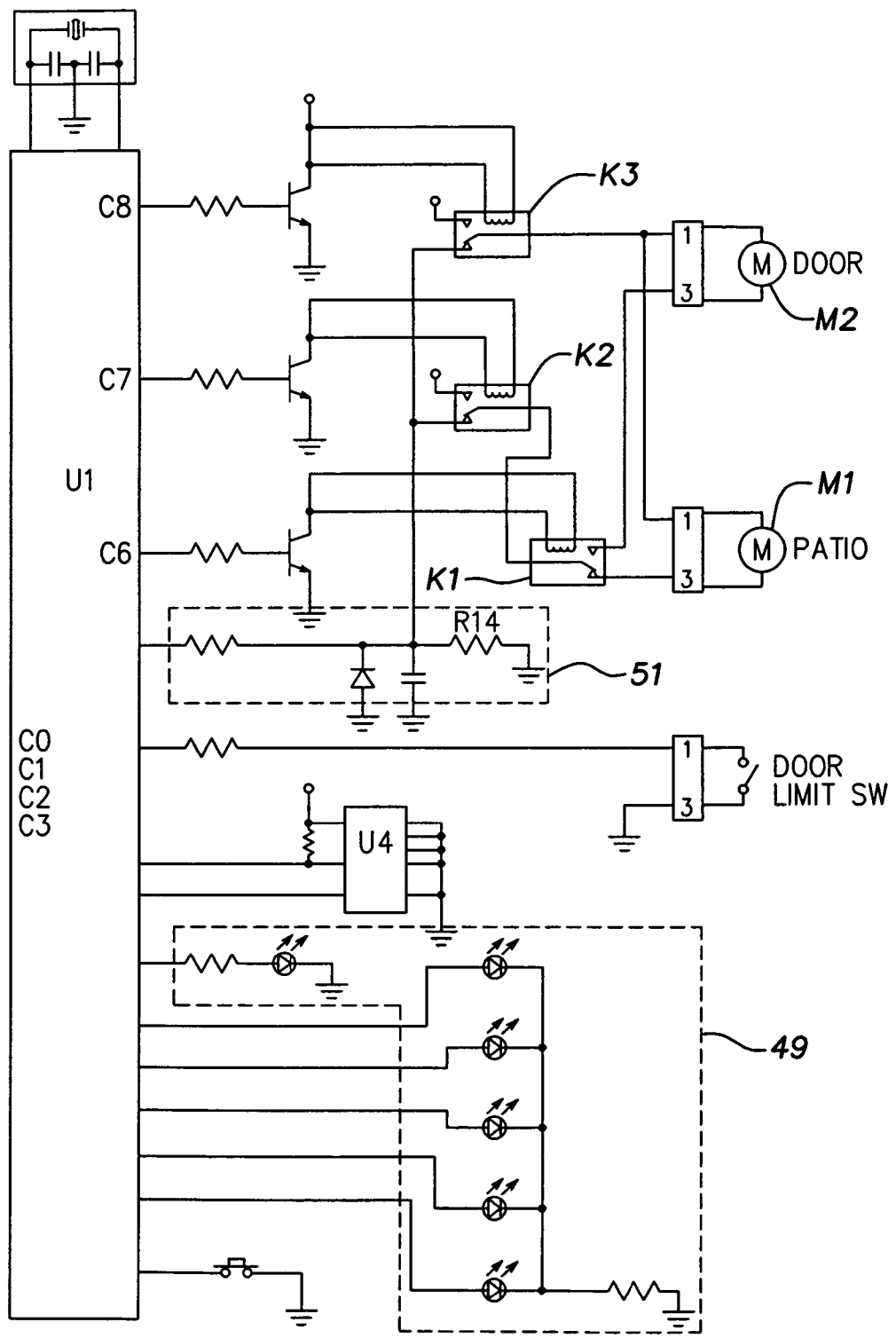
Figure 6:
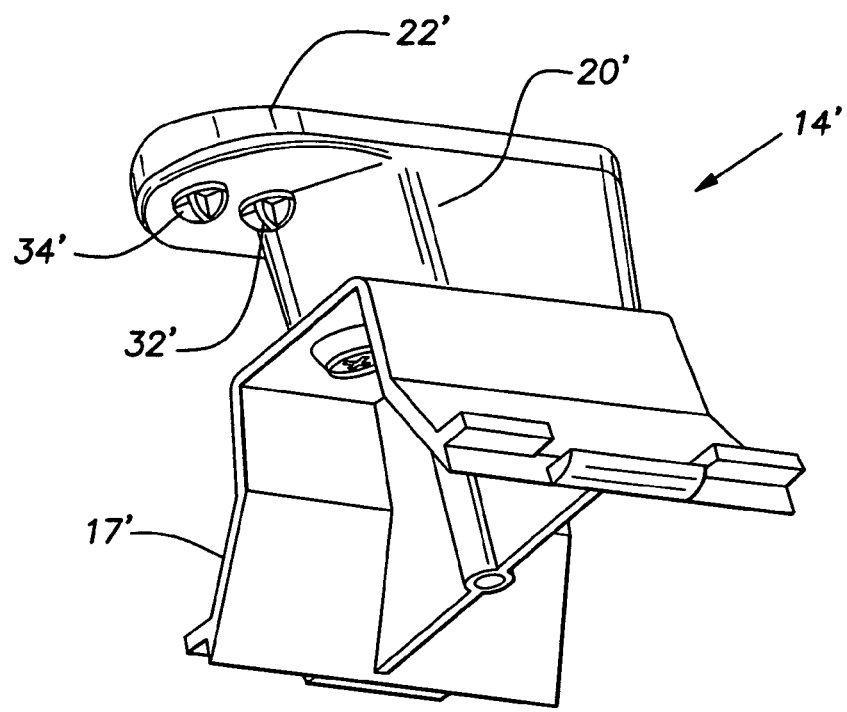
FIG. 6 is a front perspective view of a wind sensor assembly according to a second example embodiment of the present invention.
Figure 7:
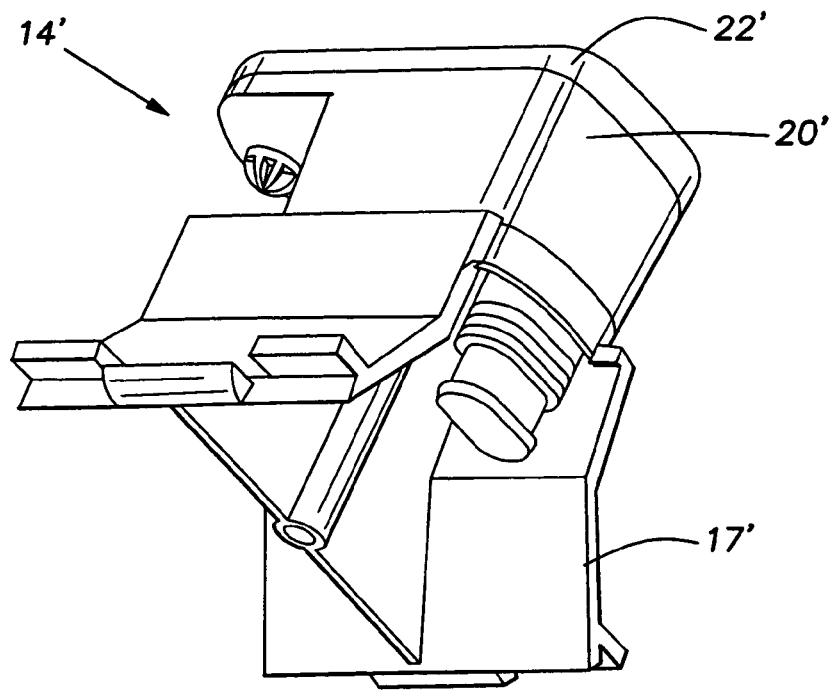
FIG. 7 is a back perspective view of the wind sensor assembly of FIG. 6.
Figure 8:
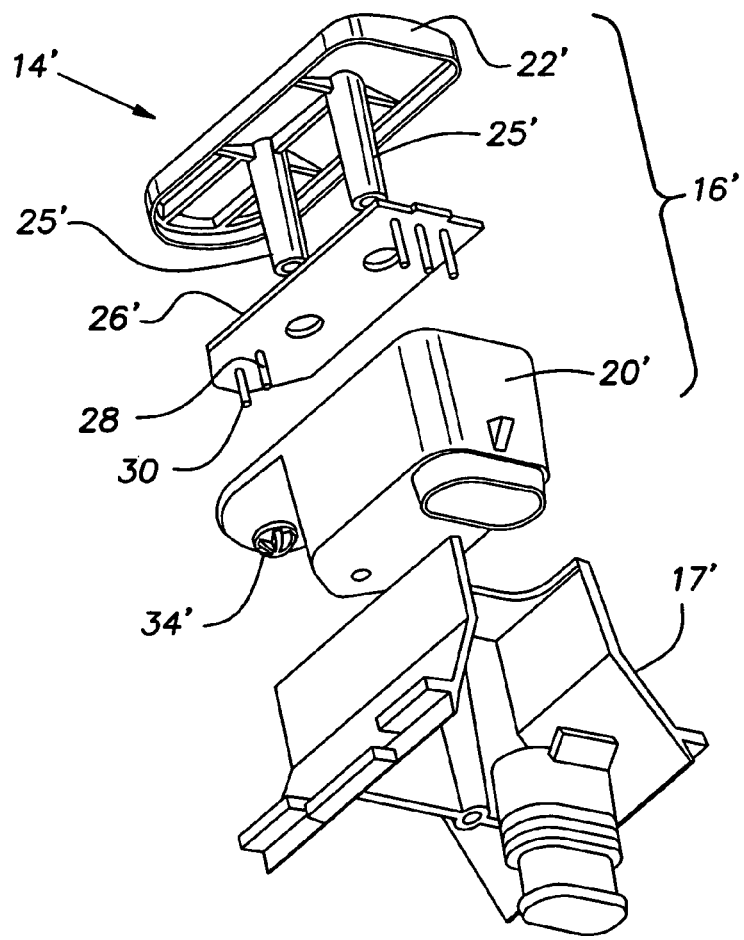
FIG. 8 is an exploded perspective view of the wind sensor assembly of FIG. 6.
Figure 9:
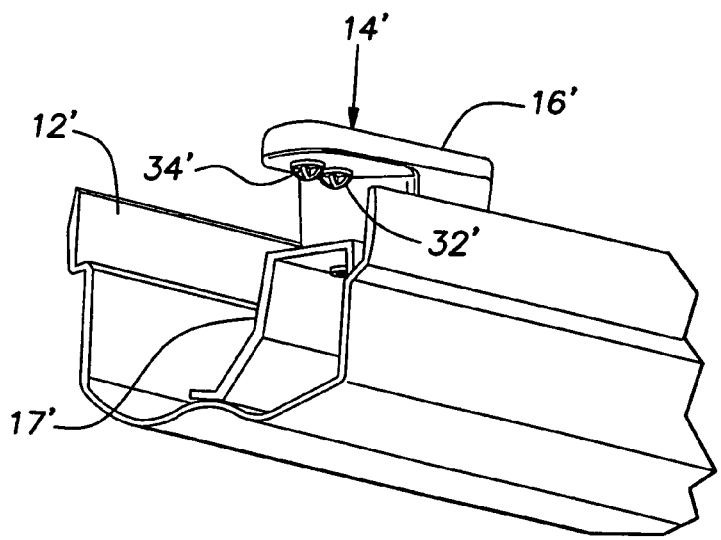
FIG. 9 shows the wind sensor of FIG. 6 mounted on a side member of an awning support frame.

Referring to the schematic diagram illustrating the wind speed-sensing control circuit 18 shown in FIGS. 5A, 5B and 5C, the two roll-type awnings 8a, 8b (FIG. 1) are respectively powered for extension and retraction by the first motor M1 and a second motor M2 (FIG. 5B). A 10-bit A/D converter microprocessor U1 controls the operation of the motors M1, M2 based upon various inputs and parameters as described below in detail. Alternatively, another suitable control circuit could be used, such as the control circuit shown and described in U.S. Pat. No. 6,798,158 to Evans, which is incorporated by reference herein.

Wired remote control switches SW1, SW2 are provided for respectively opening and closing the first awning 8a and the second awning 8b (FIG. 1). A wireless remote control circuit 46 comprising a radio frequency (RF) receiver integrated circuit module U2 is also provided as an alternative means for opening and closing the fast awning 8a and the second awning 8b (FIG. 2). A remote control transmitter, such as a key fob (not shown), is used to operate the RF module U2.

A first relay K1 is provided for selectively connecting power to one of the first motor M1 and the second motor M2. A second relay K2 and a third relay K3 are provided for controlling the direction of either the first motor M1 or the second motor M2. The direction of the selected motor M1, M2 is controlled by the polarity of the power provided. Thus, the second and third relays K2, K3 are each connected to one side of the motors' coils. Each of the second and third relays K2, K3 selectively connects the respective side of the selected motor M1, M2 to either +12 VDC or to ground, thereby selecting the direction of operation of the selected motor M1, M2. When both sides of the selected motor M1, M2 are connected to ground through the relays K2, K3, a braking action of the selected motor M1, M2 is caused. Alternatively, the relays could be replaced with other switching elements, such as transistor, triacs, optoisolators and the like.

The first and second thermistors 28,30 are connected to the 10-bit A/D converter microprocessor U1 for detecting wind speed. A thermistor control circuit 48 is provided between the second thermistor 30 and the microprocessor U1 for heating the second thermistor 30 to a predetermined temperature. The microprocessor U1 can cause the thermistor control circuit 48 to heat the second thermistor 32 by providing an output at one of the output pins of the microprocessor U1. The heating is stopped by an output at another output pin of the microprocessor U1.

The resistance of the first thermistor 28, which is proportional to its temperature, is read by the microprocessor U1 at input pin of the microprocessor U1. The resistance of the second thermistor 30, which is also proportional to its temperature, is read by the microprocessor at another input pin of the microprocessor U1 connected to the thermistor control circuit 48.

A self-calibrating wind speed measurement is performed by an appropriate software algorithm using the 10-bit A/D converter microprocessor U1. The threshold speed is set at a nominal level, such as 18 miles per hour (mph).

An LED circuit 49 is connected to another output of the microprocessor U1 to provide feedback to the user, such as wind speed, a flashing alert for strong wind, low battery voltage, etc. An ignition interlock circuit 50 is connected to an ignition circuit (not shown) of the recreational vehicle 10 to allow the microprocessor U1 to read the state of the ignition at input A4.

Operation of the microprocessor in response to the wired remote switches SW1 and SW2 is as follows. When the first wired remote switch SW1 selectively connects power to either input pin C0 or input pin C1 of the microprocessor U1, the microprocessor U1 causes, via output C6, the first relay K1 to connect the second relay K2 to the first motor M1. If the first wires remote switch SW1 is powering input pin C1 of the microprocessor, then the microprocessor U1, via output C7, causes the second relay K2 to connect the first motor M1 to +12 VDC and the microprocessor U1, via output C8, causes the third relay K3 to connect the other side of the first motor M1 to ground causing the first awning 8A (FIG. 1) to retract. Likewise, if the first wired remote switch SW1 is powering input pin C0 of the microprocessor U1, then the microprocessor U1, via output C8, causes the third relay K3 to connect to connect the first motor M1 to +12 VDC and the microprocessor U1, via output C7, causes the second relay K2 to connect the other side of the first motor M1 to ground, causing the first awning 8A (FIG. 1) to extend.

The second wired remote switch SW2 operates in a similar fashion to the first wired remote switch SW1, except that selectively connects power to either input C2 or input C3, causing the microprocessor U1 to cause the first relay K1 to connect the second relay K2 to the motor M2 for operation of the second awning 8b (FIG. 1).

The wireless remote circuit 46 operates similarly to the wired remote switches SW1, SW2. In response to input C0 the microprocessor U1 causes the first awning 8a (FIG. 1) to extend, and in response to input C1, the microprocessor U1 causes the first awning 8a (FIG. 1) to retract. Likewise, in response to input C2, the microprocessor U1 causes the second awning 8b (FIG. 1) to extend, and in response to input C3, the microprocessor U1 causes the second awning 8b (FIG. 1) to retract.

A current sensing circuit 51 (FIG. 5C) is to protect the motors M1, M2 from damage. The current sensing circuit 51 operates based on the current sensing resistor R14 and a A/D converting input pin to the microprocessor U1 of the control. The software of the microprocessor U1 will determine the value of the current threshold of the motor M1, M2 at each time the motor is energized. The set threshold value may vary due the different motor manufacturing and the load applied to the motor M1, M2. If at any time during the operation the motor exceed the current threshold, the microprocessor U1 of the control will disable the power to the motors M1, M2.

Operation of the 10-bit A/D microprocessor U1 in response to the wind sensor 14 is as follows. In order to take a wind speed measurement, the microprocessor U1 activates the heating of the second thermistor 30 at one of its output pins. When the second thermistor 30 reaches a predetermined temperature, such as 80 degrees Celsius, the microprocessor U1 turns off the heating. After a predetermined amount of time, such as 5 seconds, the microprocessor then reads the resistance values of the first and second thermistors 28, 30. The drop in temperature of the second thermistor 30 over the predetermined amount of time is indicative of wind speed, as corrected by the ambient temperature measurement represented by the resistance of the first thermistor 28. Since thermistors are neither linear nor consistent from thermistor to thermistor, a lookup table is created in advance for a particular sensor 14, such as in the factory, by taking the above measurements over a range of known wind speeds and a range of known temperatures. The microprocessor U1 then uses the lookup table to determine the actual wind speed based on the ambient temperature measurement and the drop in temperature of the heated thermistor 30 by correlating them to wind speed. All foreseeable variances, such as orientation of the wind sensor, ambient temperature, voltage regulator are taking into account during a self-calibration of the wind sensor which adjusts the set threshold value to produce a self-calibrating threshold value for wind speed.

The wind speed determination is performed repeatedly at a set interval, for example, every two seconds. Each current wind speed value thus retrieved from the lookup table is stored in a cumulative table in a storage device, such as a random access memory (RAM) device. A value n is equal to the number of current wind speed values retained in the cumulative table in a first in, first out (FIFO) manner. A cumulative wind speed value is determined by summing the last n values in the table. A cumulative average wind speed is then determined by dividing the wind speed values stored in the table by n.

The cumulative average wind speed is then compared to the self-calibrating threshold value. If the cumulative average wind speed is equal to or greater than the threshold value, the microprocessor automatically causes at least one of the first awning 8a and the second awning 8b (FIG. 1) to close. Since the awning 8a, 8b is closed in response to a cumulative average wind speed, rather than a single measurement, a brief gust of wind which exceeds the threshold wind speed will not cause the awnings 8a, 8b to retract unless the magnitude of the gust is great enough to cause the cumulative average to exceed the threshold wind speed.

Alternatively, the summed cumulative wind speed value can be compared to a cumulative threshold value, thus eliminating the need for calculating an avenge wind speed.

Two "Enable/Disable Sensor" buttons are provided to the user through the key fob to enable or disable the automatic operation of the awnings in response to high winds. The combination of the two buttons on the key fob is pushed to toggle between enabling and disabling the wind sensor via the wireless remote control circuit 46. Further, the microprocessor U1 detects at an input pin that the ignition switch of the recreational vehicle has been activated to automatically disable the opening the awnings 8a, 8b (FIG. 1).

If the 10-bit A/D converter microprocessor U1 loses communication with the wind sensor 14, the microprocessor U1 activates the LED circuit 49 causing it to flash at a certain frequency to notify the user that the wind sensor 22 is not present or is not functioning properly.

A power supply circuit 52 supplies operating power to the first motor M1, the second motor M2, the wireless remote control circuit 46, the thermistor control circuit 48 and the microprocessor U1.

According a second example embodiment of the present invention, as shown in FIGS. 6-9, a wind speed sensor 14' includes a sensor assembly 16' and a sensor mounting structure 17' for attaching the sensor 14' to a side arm 12' of an awning. The sensor assembly 16' includes a sensor housing 20' and a housing cover 22'. A plurality of pillars or mounting bosses 25' extending from the housing cover 22' supports and spaces the housing cover 22' away from the sensor housing 20'.

A sensor circuit board 26' is provided within the housing 20' directly beneath the housing cover 22'. The first thermistor 28 and the second thermistor 30 are mounted to the sensor circuit board 26' and extend respectively through a first thermistor hole 32' and a second thermistor hole 34' in the housing 20' out of the housing.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A powered awning assembly comprising:
an awning frame comprising a first side arm member having a first distal end and a first proximate end for attachment to a wall, a second side arm member having a second distal end and a second proximate end for attachment to a wall, and a connecting member having a first end attached to the distal end of the first side arm and a second end attached to the distal end of the second side arm;
a roll awning attached to the awning frame;
a wind sensor assembly attached to one of the first side arm and the second side arm; the wind sensor assembly comprising a sensor housing comprising a housing base and a housing cover, a sensor mounting structure for removably receiving the sensor housing, a wind speed sensing zone located between the housing base and the housing cover, a first thermistor positioned within the sensing zone for measuring a temperature of wind in the sensing zone, and a second thermistor positioned within the sensing zone for sensing a cooling effect over time of wind in the sensing zone;
a thermistor control circuit for heating the second thermistor to a predetermined temperature;
a motor for opening an awning;
a relay for selectively connecting power to the motor;
a wired remote switch for opening and closing of the awning;
a wireless remote control circuit for opening and closing of the awning;
an ignition interlock circuit for connection to an ignition circuit of the recreational vehicle;
a microprocessor for causing the relay to control the opening and closing of the awning in response to inputs received from the wired remote control and the wireless remote control circuit, wherein the microprocessor repeatedly receives input from the first thermistor and the second thermistor, repeatedly retrieves a corresponding wind speed value from a lookup table, repeatedly stores the corresponding wind speed value, repeatedly calculates a cumulative average wind speed value and automatically causes the awning to close when the cumulative average wind speed value reaches or exceeds the threshold wind speed, and wherein the microprocessor prevents the opening of the awning in response to an ignition signal received from the ignition interlock;
a power supply circuit for supplying operating power to the motor, the wireless remote control circuit, the thermistor control circuit and the microprocessor; and
a first sensor enable switch and a second sensor enable switch for selectively enabling and disabling the automatic closing of the awning by the microprocessor when both the first sensor enable switch and the second sensor enable switch are activated together.

2. A powered awning assembly comprising:
an awning frame comprising a first side arm member having a first distal end and a first proximate end for attachment to a wall, a second side arm member having a second distal end and a second proximate end for attachment to a wall, and a connecting member having a first end attached to the distal end of the first side arm and a second end attached to the distal end of the second side arm;
a roll awning attached to the awning frame; and
a wind sensor assembly attached to one of the first side arm and the second side arm, the wind sensor assembly comprising an upper skirt, a lower skirt and a thermal element wind sensor, the upper skirt including a first aperture and a second aperture,
wherein the thermal element wind sensor comprises:
a first thermistor extending through a first aperture of the upper skirt of the wind sensor assembly;
a second thermistor extending through a second aperture of the upper skirt of the wind sensor assembly; and
wherein a wind sensing zone is defined in the space between the upper skirt, and the lower skirt.

3. A powered awning assembly comprising:
an awning frame comprising a first side arm member having a first distal end and a first proximate end for attachment to a wall, a second side arm member having a second distal end and a second proximate end for attachment to a wall, and a connecting member having a first end attached to the distal end of the first side arm and a second end attached to the distal end of the second side arm;
a roll awning attached to the awning frame; and
a wind sensor assembly mounted to be movable with one of the first side arm member and the second side arm member, the wind sensor assembly comprising a thermal element wind sensor, the wind sensor assembly further comprising an upper skirt, a lower skirt and a wind speed sensing zone therebetween, the wind sensor located in the wind speed sensing zone.

* * * * *

UNITED STATES PATENT AND TRADEMARK OFFICE
CERTIFICATE OF CORRECTION

PATENT NO.       : 7,828,036 B2
APPLICATION NO.  : 11/289243
DATED            : November 9, 2010
INVENTOR(S)      : Tran Page 1 of 1

It is certified that error appears in the above-identified patent and that said Letters Patent is hereby corrected as shown below:

Column 4 line 14 delete the words "to connect"

Signed and Sealed this
Third Day of May, 2011

David J. Kappos
*Director of the United States Patent and Trademark Office*